United States Patent [19]
Cook

[11] Patent Number: 6,079,937
[45] Date of Patent: Jun. 27, 2000

[54] MATERIAL-HANDLING VEHICLE

[75] Inventor: David Allan Cook, Cheadle, United Kingdom

[73] Assignee: J. C. Bamford Excavators Limited, Staffordshire, United Kingdom

[21] Appl. No.: 09/288,922

[22] Filed: Apr. 9, 1999

[30]     Foreign Application Priority Data

Apr. 9, 1998 [GB] United Kingdom .................... 9807538

[51] Int. Cl.$^7$ .................................................. B60K 5/12
[52] U.S. Cl. ........................................... 414/680; 180/291
[58] Field of Search .................................. 414/680, 685; 180/291, 374, 375, 383, 312, 233, 245

[56]              References Cited

U.S. PATENT DOCUMENTS

| Re. 30,021 | 6/1979 | Olson et al. . | |
|---|---|---|---|
| 2,404,442 | 7/1946 | Hutchings | 180/291 |
| 2,751,029 | 6/1956 | Dixon | 180/291 |
| 3,101,150 | 8/1963 | Janson et al. | 180/291 |
| 3,889,782 | 6/1975 | Geis | 180/291 |
| 4,955,455 | 9/1990 | Albright et al. | 180/291 |
| 5,836,733 | 11/1998 | Moses et al. . | |

FOREIGN PATENT DOCUMENTS

| 2009968 | 8/1991 | Canada . |
|---|---|---|
| 0 656 315 A1 | 11/1994 | European Pat. Off. . |
| 27 39 537 A1 | 3/1978 | Germany . |
| 240 869 A1 | 11/1986 | Germany . |
| 1 374 039 | 11/1974 | United Kingdom . |
| WO 89/00972 | 2/1989 | WIPO . |

*Primary Examiner*—Gregory A. Morse
*Attorney, Agent, or Firm*—Marshall, O'Toole, Gerstein, Murray & Borun

[57]              ABSTRACT

A material-handling vehicle including a structure having, a ground engageable propulsion arrangement, a loader arm mounted for up and down swinging movement, an operator's cab, an engine having an output to provide power for the movement of the loader arm and propulsion of the vehicle and drive to connect the output to the ground engageable propulsion arrangement to propel the vehicle. The vehicle has a rear axle and the engine is mounted on the structure rearwardly of the rear axle. The output of the engine is kinematically connected over the rear axle to an input of a change speed gearbox an output of which is kinematically connected to the ground engageable propulsion arrangement. The output of the engine is kinematically connected to an input of a transfer mechanism which has an output, disposed higher than the input, which is kinematically connected to the input of the gearbox.

23 Claims, 1 Drawing Sheet

MATERIAL-HANDLING VEHICLE

BACKGROUND TO THE INVENTION

This invention relates to a material-handling vehicle of the kind, hereinafter referred to as the "kind specified", including a structure having, ground engageable propulsion means, a loader arm mounted for up and down swinging movement, an operator's cab, an engine having an output to provide power for said movement of the loader arm and propulsion of the vehicle and drive to connect the output to the ground engageable propulsion means to propel the vehicle.

DESCRIPTION OF THE PRIOR ART

One vehicle of the kind specified is disclosed in U.S. Pat. No. Re. 30,021. In this machine, which is relatively large, the loader arm is substantially horizontal but is angled downwardly in the forward direction, is partly accommodated in a well provided between the cab and a load carrying platform disposed on the opposite side of the loader arm to the operator's cab. As a result the loader arm, in a fully lowered position, is disposed below a horizontal plane containing the top of a steering wheel in the operator's cab so that the driver's vision is substantially unobstructed. This vehicle is sufficiently large that an upright engine to provide power for swinging movement of the arm and propulsion of the vehicle can be accommodated beneath the well on the centre line of the vehicle.

WO-A-89/00972, CA-A-2,009,968 and EP-A-0,656,315 discloses vehicles of the kind specified in which a loader arm, in a fully lowered position, is similarly substantially horizontal, although the precise angle of the loader arm varies in the three above referred to specifications, is at least partly accommodated in a well disposed between the operator's cab and a housing in which the engine is disposed. The loader arm is disposed so it does not at least substantially interfere with the view of the operator in this direction.

A vehicle configuration as disclosed in these three references, in which the engine is offset to be on the opposite side of the loader arm to the cab, enables the vehicle to be made smaller than the vehicle of U.S. Pat. No. Re. 30,021 and enables the overall height of the vehicle to be reduced.

DE-A-2,739,537 discloses another vehicle of the kind specified but in which the loader arm, in its lowered position is disposed so that the loader arm is entirely above the level of the top of the engine and its associated housing. Accordingly the vehicle is unprovided with any well so that in a lowered position the loader arm extends alongside the operator's cab substantially above the bottom of a side window therein so that the driver's view transversely of the vehicle is obstructed.

All the above mentioned vehicles suffer from one or other disadvantage.

In U.S. Pat. No. Re. 30,021 because of the disposition of the engine underneath the loader arm the operator's cab is required to be relatively high so that the operator can still see over the top of the loader arm whilst providing sufficient space beneath the loader arm for the accommodation of the engine and access to the engine is restricted.

In WO-A-89/00,972 the engine is arranged with the crankshaft thereof longitudinally of the vehicle. Access to the side of the engine adjacent to the cab is obstructed by the presence of the cab and the wheel base of the vehicle must be relatively large to accommodate the longitudinal extent of the engine between the wheels. A short wheel base is desirable as it improves manoeuvrability of the vehicle, which is important for operating in confined spaces. In a vehicle of the type described in this specification and as marketed by the applicants in respect of WO-A-89/00,972a hydro-static drive is provided to transfer drive transversely from the engine towards the ground engageable means.

In CA-A-2,009,968 the engine is also arranged with its crankshaft longitudinally of the vehicle and so suffers from the disadvantages mentioned in the preceding paragraph. In this case a mechanical drive is provided to transfer drive transversely from the engine towards the ground engageable means.

DD A 240 869 discloses a drive for a mechanical handling vehicle of the kind specified in which the engine is disposed with its crankshaft transversely of the vehicle and an angle gear drive is provided to transfer drive change 90° from the engine towards the ground engageable means.

In EP-A-0,656,316 the engine is also disposed with its crankshaft transversely to the vehicle and an angle gear drive is provided to transfer drive through 90° from the engine towards the ground engageable means.

These vehicles suffer from the disadvantage of the need to provide a relatively expensive angle gear drive and associated engineering problems to turn the drive through 90°.

In DE-A-2,739,537 the driver's view transversely across the vehicle is obstructed because of the absence of a well to accommodate the loader arm.

SUMMARY OF THE INVENTION

An object of the present invention is to provide a material-handling vehicle of the kind specified whereby the above mentioned problems are overcome or are reduced.

According to the present invention we provide a material handling vehicle of the kind specified wherein the vehicle has a rear axle and the engine is mounted on the structure rearwardly of said rear axle, the output of the engine being kinematically connected over said rear axle to an input of a change speed gearbox, an output which is kinematically connected to said ground engageable propulsion means wherein the engine is kinematically connected to an input of a transfer mechanism which has an output, disposed higher than said input, which is kinematically connected to said input of said gearbox.

The transfer mechanism may be kinematically connected to the input of gearbox by a connecting shaft.

The connecting shaft may comprise a Cardan shaft.

The gearbox may be centrally or substantially centrally disposed in said vehicle.

The gearbox may be disposed on, or substantially on, a median central longitudinal plane of said vehicle.

The transfer mechanism may comprise means whereby the speed of rotation of the output differs from the speed of rotation of the input.

The vehicle may comprise a front axle and a rear axle, ground engageable propulsion means mounted on the axles and the propulsion means of at least one of said axles being connected to said at least one output of the gearbox.

At least one of the axles may have a differential which is connected to said output of the gearbox.

The front axle may be provided with a differential which is connected to a front output of the gearbox by a shaft which may have a universal joint at least at one end.

The rear axle of the vehicle may be provided with a differential which is connected to a rear output of the gearbox by a shaft which may have a universal joint at least at one end.

A clutch or torque converter or the like may be provided between the engine and the ground engageable propulsion means.

The clutch or torque converter or the like may be provided between the input of the gearbox and said connecting shaft.

The clutch or torque converter or the like may be provided between the engine and said connecting shaft.

The gearbox may be provided with the clutch or torque converter or the like.

The vehicle may comprise a chassis having a pair of spaced longitudinally extending frame members.

The frame members may be parallel to each other.

Mounting means may be provided between the engine and the chassis.

The mounting means may comprise compliant mounting means.

The longitudinal axis of the loader arm may extend forwardly in or parallel to a vertical plane containing a longitudinal axis of the vehicle.

The structure may have a front end and a rear end with said longitudinal axis of the vehicle extending therebetween and the ground engageable propulsion means being disposed equidistant from, and on opposite sides of, said longitudinal axis.

The loader arm may be pivotally mounted towards the rear of the machine about a horizontal axis.

The loader arm may carry a material handling implement at its front end so that the material handling implement is disposed in front of the front of the structure when the arm is in its lowermost position.

The cab may have a side window which faces transversely across the vehicle at right angles to the longitudinal axis of the loader arm.

The top of the loader arm in a fully lowered position and at a location alongside the top of a steering wheel in the operator's cab may be disposed wholly or substantially wholly below a horizontal plane which is not more than 1 meter, or, preferably not more than 0.5. meter above, the top of the steering wheel so that the driver's vision is substantially unobstructed by the loader arm.

If desired, the top of the boom at said location may be wholly or substantially wholly below a horizontal plane containing the top of the steering wheel disposed in the cab.

The loader arm may be telescopic in the direction of the longitudinal axis of the loader arm.

The longitudinal axis of the loader arm may lie in a substantially horizontal plane when the loader arm is in a position in which the implement engages a horizontal plane on which the ground engageable propulsion means are supported and, if the loader arm is telescopic, the loader arm is fully retracted.

The ground engageable propulsion means may be driven wholly via a mechanical transmission or a hydrokinetic transmission.

The ground engageable propulsion means may comprise a pair of ground engageable wheels disposed adjacent the front of the structure and a pair of rear ground engageable wheels adjacent the rear of the structure.

The wheels of the front pair may be driven from the first output of the gearbox whilst the wheels of the rear pair may be driven by the output of the gearbox.

BRIEF DESCRIPTION OF THE DRAWINGS

The invention will now be described by way of example with reference to the accompanying diagrammatic drawing in which.

DESCRIPTION OF THE PREFERRED EMBODIMENTS

Figure 1:
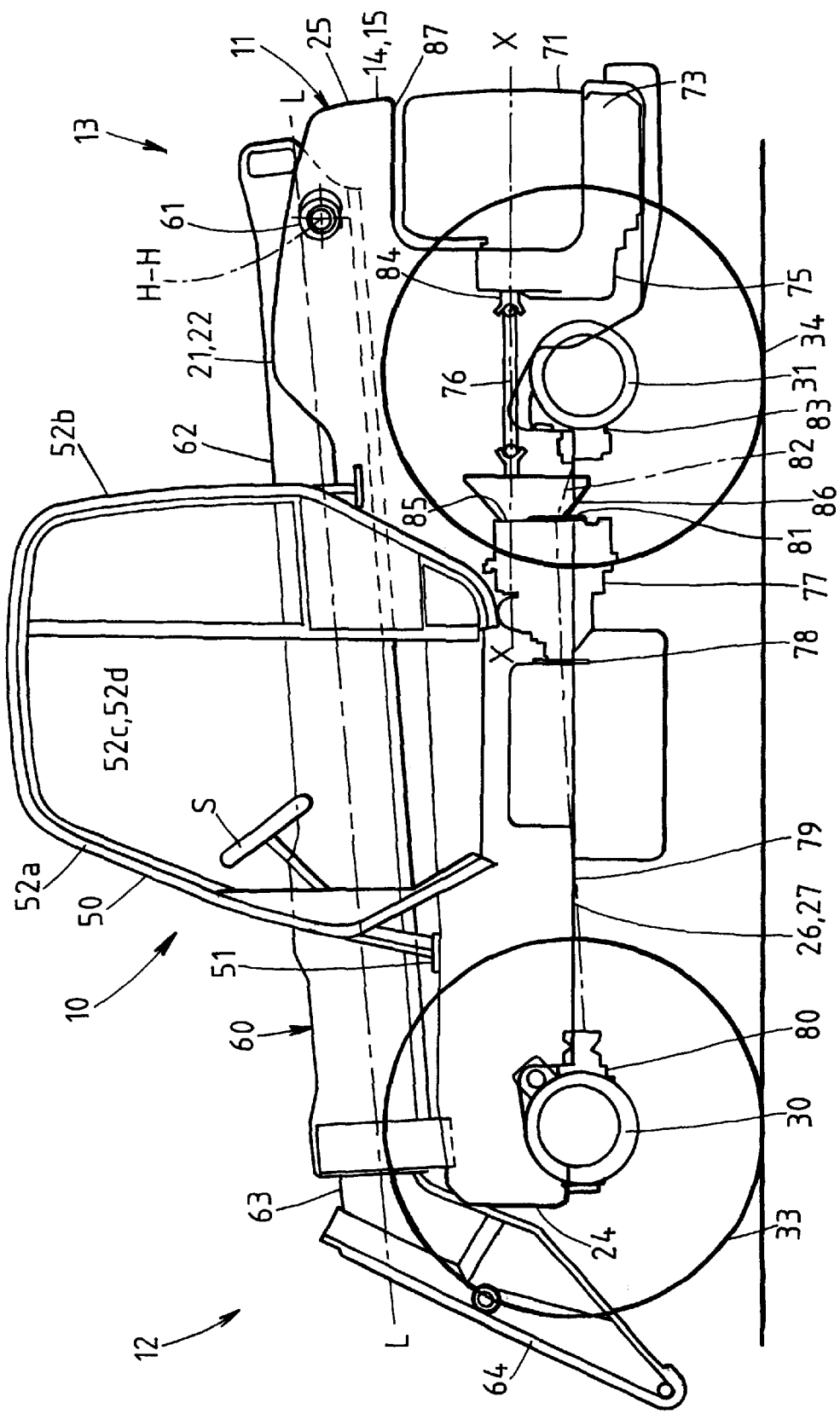
FIG. 1 is a side elevation of a telescopic loader vehicle embodying the invention.

Referring to the Figure, a material-handling vehicle is indicated generally at 10 and comprises a main structure 11 having a front end 12 and a rear end 13 with a longitudinal axis extending between the front and rear ends. The structure 11 comprises a pair of spaced parallel frame members 14, 15 held in spaced parallel relationship by cross members.

Each frame member 14, 15 has a upper surface 21, 22 respectively. At the front and rear, the frame members 14, 15 have generally upright parts 24, 25 respectively whilst on their undersides they have a lower surface 26, 27 respectively.

A front axle 30 is mounted on the frame members 14, 15 at the front end thereof whilst a rear axle 31 is mounted on the frame members 14, 15 towards the rear thereof. The axles 30, 31 are of conventional type carrying at their opposite ends front wheels 33 and rear wheels 34 respectively. Both the front wheels 33 and both rear wheels 34 are pivotable relative to their associated axis about a steering axis for steering movement of the vehicle.

An operator's cab 50 is mounted on the frame member 14 by vibration isolating mounts so that the cab 50 is supported on one side of the longitudinal axis of the vehicle. The cab 50 has a front window 52a a rear window 52b and two side windows 52c 52d the window 52c facing transversely across the machine. The or each window may be provided with a transparent closure element such as glass, or may be open, or may be provided with a protective element such as a grille or bars. A driver's seat, steering wheel S and other controls, not shown, are provided in the cab and the cab is provided with an access door or opening on the side in which the window 52d is provided.

A loader arm 60, having a longitudinal axis L—L parallel to the longitudinal axis of the vehicle, is pivotally mounted, by means of an axis member 61, between the frame members 14, 15 at the rear 13 of the vehicle for pivotal up and down swinging movement about a horizontal axis H—H. The loader arm 60 is telescopic and comprises a rear outer section 62 which is pivotally connected to the frame members 14 and 15 by the axis 61 and a forward inner member 63 which is telescopically slidable with the section 62 under the control of hydraulic ram means in conventional manner. At its front, end the part 63 is provided with a downwardly and forwardly extending part 64 adapted to carry a material handling implement such as a loader bucket or lifting forks or other desired material handling means. If desired the loader arm 60 may have more than two telescopically slidable sections or may not be telescopic.

At the rear 13 of the vehicle is mounted an engine 71 having an output. The engine 71 is, in the present example, a four cylinder diesel engine having a crankshaft, not shown, rotatable about an axis which lies in, or substantially in, the same vertical plane as the longitudinal axis of the vehicle. If desired the vertical plane containing the crankshaft may be parallel to but displaced from the vertical plane containing the longitudinal axis X—X of the vehicle, or may be inclined thereto at an angle.

The engine is mounted on the frame members 14, 15 by mounting means which may comprise four compliant mounts 73. If desired any other suitable mounting means may be provided.

The engine 71 is connected to a casing of transfer mechanism 75. The output of the engine is kinematically connected to an input of the transfer mechanism. The transfer mechanism is kinematically connected by a connecting shaft 76, which in the present example is a Cardan shaft, to a change speed gearbox 77. In the present example the gearbox 77 is of conventional type so that the drive ratio of the vehicle can be changed in conventional manner. The gearbox 77 is arranged so that its central longitudinal axis is coincident or substantially coincident with the central longitudinal axis of the vehicle and is arranged between the front and rear wheels at a longitudinal position adjacent the centre of the wheel base but, in the present example displaced rearwardly of the centre.

The gearbox 77 has a front output 78 which is connected by a propeller shaft 79 to a differential 80 of the front axle 30. A rear output 81 of the gearbox 77 is connected by a propeller shaft 82 to a differential 83 of the rear axle 31.

The transfer box 75, in the present example, comprises an input connected to the output of the engine and hence to the crankshaft of the engine. The transfer box comprises two intermeshed pinions. The input of the transfer box comprises an input shaft which carries a first of said pinions which is in mesh with a second of said pinions which is carried on an output shaft of the transfer box. The output shaft is parallel to the input shaft of the transfer mechanism but disposed there above so that an output 84 of the transfer mechanism can be connected by the connecting shaft 76 to an input 85 of the gearbox with the connecting shaft 76 passing over the top of the rear axle 31. If desired, the pinions of the transfer mechanism may be of different diameter so that a step up or step down of speed can be obtained between the input and the output of the transfer mechanism.

If desired the transfer mechanism may be other than comprising two meshing pinions. For example it may be provided by more than two meshing gears or a chain drive may be provided.

The shaft 76 provides an input to a torque converter which is provided within a torque converter housing 86 fastened to the gearbox 77 so that an output of the torque converter provides an input to the gearbox.

If desired, however, the torque converter may be provided at any other suitable place in the drive mechanism. For example, the torque converter may be provided between the engine and the transfer mechanism or between the transfer mechanism and the connecting shaft 76.

If the engine 71 is disposed, for example, transversely of the rear of the vehicle a suitable bevel drive may be provided to turn the output of the engine through an appropriate angle. In this case the connecting shaft 76 may be inclined to the longitudinal axis of the vehicle and connected to the output of the transfer box and the input of the gearbox by connecting means capable of accepting a relatively large angle or by appropriate bevel gears.

The frame members 14, 15 may be provided with a contoured region 87 to accommodate the e and or transfer box the shape of the contour depending upon the shape and dimension of the engine and its orientation.

The gearbox 77 including the torque converter housing 86 is mounted on the chassis.

Although in this example the torque converter housing 86 is provided by virtue of the torque converter housing being separate from and bolted to, the gearbox 77, if desired, the gearbox may have an integral extension part which wholly or partly provides a torque converter housing part. Moreover, the torque converter may be housed in any other desired manner so as to be operatively disposed between the gearbox and the engine or at any other suitable disposition in the drive path from the engine to the ground engageable propulsion means. If desired, other means for disconnecting drive to the ground engageable propulsion means when the vehicle is stationary may be provided.

If desired, other forms of mechanical transfer means may be provided to transfer the drive between the engine and the gearbox over the rear axle 31.

Disposed at a suitable position on the vehicle is a cooling radiator through which coolant of the engine is circulated through pipes and the radiator is provided with an hydraulically operated fan or, if desired, by an electrically or mechanically operated fan, to cause flow of cooling air of the radiator. Suitable ventilation openings may be provided in the vehicle for flow of such air.

The top of the loader arm in a fully lowered position and at a location alongside the top of a steering wheel in the operator's cab may be disposed wholly or substantially wholly below a horizontal plane which is not more than 1 meter, or preferably not more than 0.5. meter, above the top of the steering wheel so that the driver's vision is substantially unobstructed by the loader arm.

If desired, the top of he boom at said location may be wholly or substantially wholly below a horizontal plane containing the top of the steering wheel.

The aim in its lowered position may be horizontal or may extend forwardly and downwardly.

The loader arm may be telescopic in the direction of the longitudinal axis of the loader arm.

The longitudinal axis of the loader arm may lie in a substantially horizontal plane when the loader arm is in a position in which the implement engages a horizontal plane on which the ground engageable propulsion means are supported and, if the loader arm is telescopic, the loader arm is fully retracted.

In this specification by "substantially horizontal" we mean that the longitudinal axis is either in a horizontal plane or is in a plane which is inclined upwardly or downwardly to the horizontal at an angle lying in the range +5° to −25°.

If desired the wheels on the front axle may have a different track to the wheels of the rear axle.

The wheels of an axle are equally distant from, and on opposite sides of, the longitudinal axis of the vehicle.

If desired the ground engageable propulsion means may comprise endless tracks extending fore and aft between the front and rear axles on a respective side of the vehicle.

By a "longitudinal axis of the vehicle" we mean an axis which passes through a mid point of the front track and the rear track of the vehicle.

A vehicle embodying of the present invention has an engine, which is mounted at the rear of the vehicle but which is mounted lower hand has hitherto been possible by virtue of transferring the drive over the top of the rear axle to a gearbox disposed within the wheel base of the vehicle.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features be utilised for realising the invention in diverse forms thereof.

What is claimed is:

1. A material handling vehicle including a structure, having ground engageable propulsion means, a loader arm pivotally mounted towards the rear of the vehicle about a horizontal axis for up and down swinging movement, the longitudinal axis of the loader arm extending forwardly in or parallel to a vertical plane containing a longitudinal axis of the vehicle, an operator's cab, disposed to one side of the loader arm, an engine having an output to provide power for said movement of the loader arm and propulsion of the vehicle and drive to connect the output to the ground engageable propulsion means to propel the vehicle, wherein the vehicle has a rear axle and the engine is mounted on the structure rearwardly of said rear axle, the output of the engine being kinematically connected over said rear axle to an input of a change speed gearbox an output of which is kinematically connected to said ground engageable propulsion means wherein the engine extends below said rear axle and the output of the engine is kinematically connected to an input of a transfer mechanism which has an output, disposed higher than said input, which is kinematically connected to said input of said gearbox.

2. A vehicle according to claim 1 wherein the transfer mechanism is kinematically connected to the input of the gearbox by a connecting shaft.

3. A vehicle according to claim 2 wherein the connecting shaft comprises a Cardan shaft.

4. A vehicle according to claim 1 wherein the gearbox is substantially centrally disposed in said vehicle.

5. A vehicle according to claim 1 wherein the gearbox is disposed on, or substantially on, a median central longitudinal plane of said vehicle.

6. A vehicle according to claim 1 wherein the transfer mechanism includes means whereby the speed of rotation of the output differs from the speed of rotation of the input.

7. A vehicle according to claim 1 wherein the vehicle includes a front axle and a rear axle each having a ground engageable propulsion means and the propulsion means of at least one of said axles being connected to said at least one output of the gearbox.

8. A vehicle according to claim 7 wherein at least one of said axles has a differential which is connected to said at least output of the gearbox.

9. A vehicle according to claim 7 wherein at least one of said axles is connected between said wheels and said at least one output of the gearbox connected to a front output of the gearbox by a shaft which has a universal joint at least at one end.

10. A vehicle according to claim 7 wherein the rear axle of the vehicle is connected to a rear output of the gearbox which by a shaft which has a universal joint at least at one end.

11. A vehicle according to claim 1 wherein a drive connecting device is provided between engine and the ground engageable propulsion means.

12. A vehicle according to claim 11 wherein the drive connecting device is provided between the input of the gearbox and said connecting shaft.

13. A vehicle according to claim 11 wherein the drive connecting device is provided between the engine and said connecting shaft.

14. A vehicle according to claim 11 wherein the gearbox is provided with the drive connecting device.

15. A vehicle according to claim 1 wherein the vehicle comprises a chassis having a pair of spaced longitudinally tending fame members.

16. A vehicle according to claim 15 wherein mounting means is provided between the engine and the chassis.

17. A vehicle according to claim 1 wherein the ground engageable propulsion means comprises a pair of ground engageable wheels disposed adjacent the front of the structure and a pair of rear ground engageable wheels adjacent the rear of the structure.

18. A vehicle according to claim 1 wherein the wheels of the front pair are driven from the first output of the gearbox whilst the wheels of the rear pair may be driven by the rear output of the gearbox.

19. A vehicle according to claim 1 wherein the cab has a side window which faces transversely across the vehicle at rights angles to the longitudinal axis of the loader arm.

20. A vehicle according to claim 1 wherein the top of the loader arm in a fully lowered position and at a location alongside the top of a steering wheel in the operator's cab is disposed wholly or substantially below a horizontal plane which is not more than 1 meter, preferably not more that 0.5 meters above, the top of the steering wheel so at the driver's vision is substantially unobstructed by the loader arm.

21. A vehicle according to claim 20 wherein the top of the boom is wholly or substantially wholly below a horizontal plane containing the top of the steering wheel disposed in the cab.

22. A vehicle according to claim 1 wherein the longitudinal axis of the loader arm lies in a substantially horizontal plane when the loader arm is in a position in which the implement engages a horizontal plane on which the ground engageable propulsion means are supported.

23. A vehicle according to claim 1 wherein the ground engageable propulsion means are driven wholly via a mechanical transmission or a hydrokinetic transmission.

* * * * *